United States Patent [19]
Chang

[11] Patent Number: 5,383,054
[45] Date of Patent: Jan. 17, 1995

[54] AUTOMOBILE REAR-VIEW MIRROR

[76] Inventor: Shih-Pan Chang, No. 29, Wan Lien Lane, Wan Lien Li, Yuan Lin Town, Changhua, Taiwan, Prov. of China

[21] Appl. No.: 205,403

[22] Filed: Mar. 3, 1994

Related U.S. Application Data

[63] Continuation-in-part of Ser. No. 114,624, Sep. 2, 1993, Pat. No. 5,343,328.

[51] Int. Cl.⁶ .......................... G02B 5/08; G02B 7/18; B60R 1/06
[52] U.S. Cl. ................................. 359/507; 359/509; 359/871; 359/877; 15/250.003
[58] Field of Search ............... 359/507, 509, 871, 877; 15/250.003

[56] References Cited

U.S. PATENT DOCUMENTS

| | | | |
|---|---|---|---|
| 4,898,458 | 2/1990 | McDonald | 359/509 |
| 4,963,011 | 10/1990 | Lu et al. | 359/509 |
| 4,979,809 | 12/1990 | Peters | 359/509 |

Primary Examiner—Ricky D. Shafer
Attorney, Agent, or Firm—Beveridge, DeGrandi, Weilacher & Young

[57] ABSTRACT

An automobile rear-view mirror includes a casing to hold a mirror, a flow guide member pivotally disposed at the top of the casing, a rotary vane disposed inside casing, a gear box fastened to the casing at one side and having a first transmission gear driven by a first motor thereof to turn the flow guide member in either direction for allowing outside currents of air to be guided through an elongated opening on the casing toward the mirror to remove moisture from the mirror, and a second transmission gear driven by a second motor thereof to turn the rotary vane causing it to induce currents of air from vent holes on the bottom of the casing into the casing and permitting the induced currents of air to be guided by an angle flange inside the casing toward the mirror to remove moisture from the mirror.

1 Claim, 6 Drawing Sheets

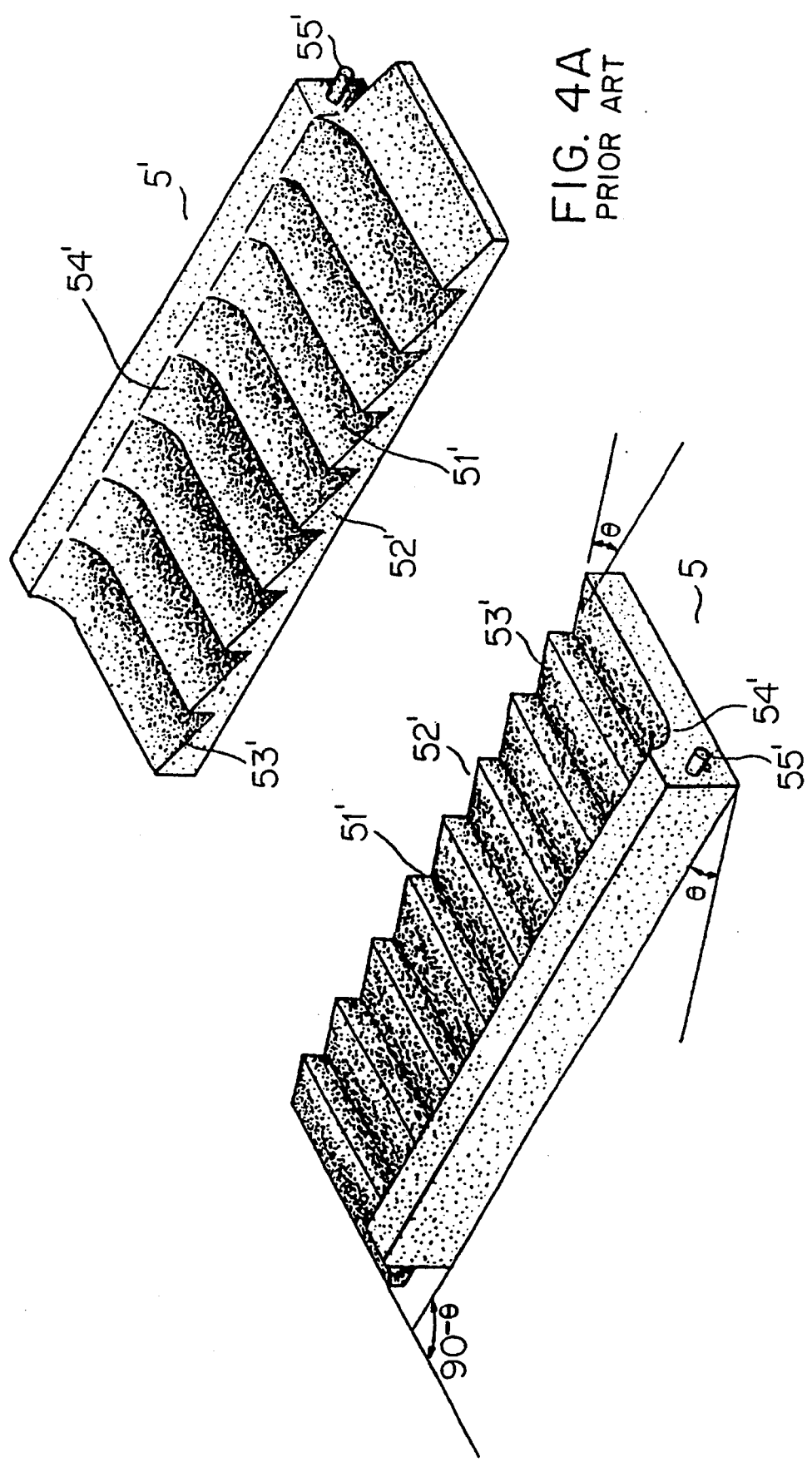

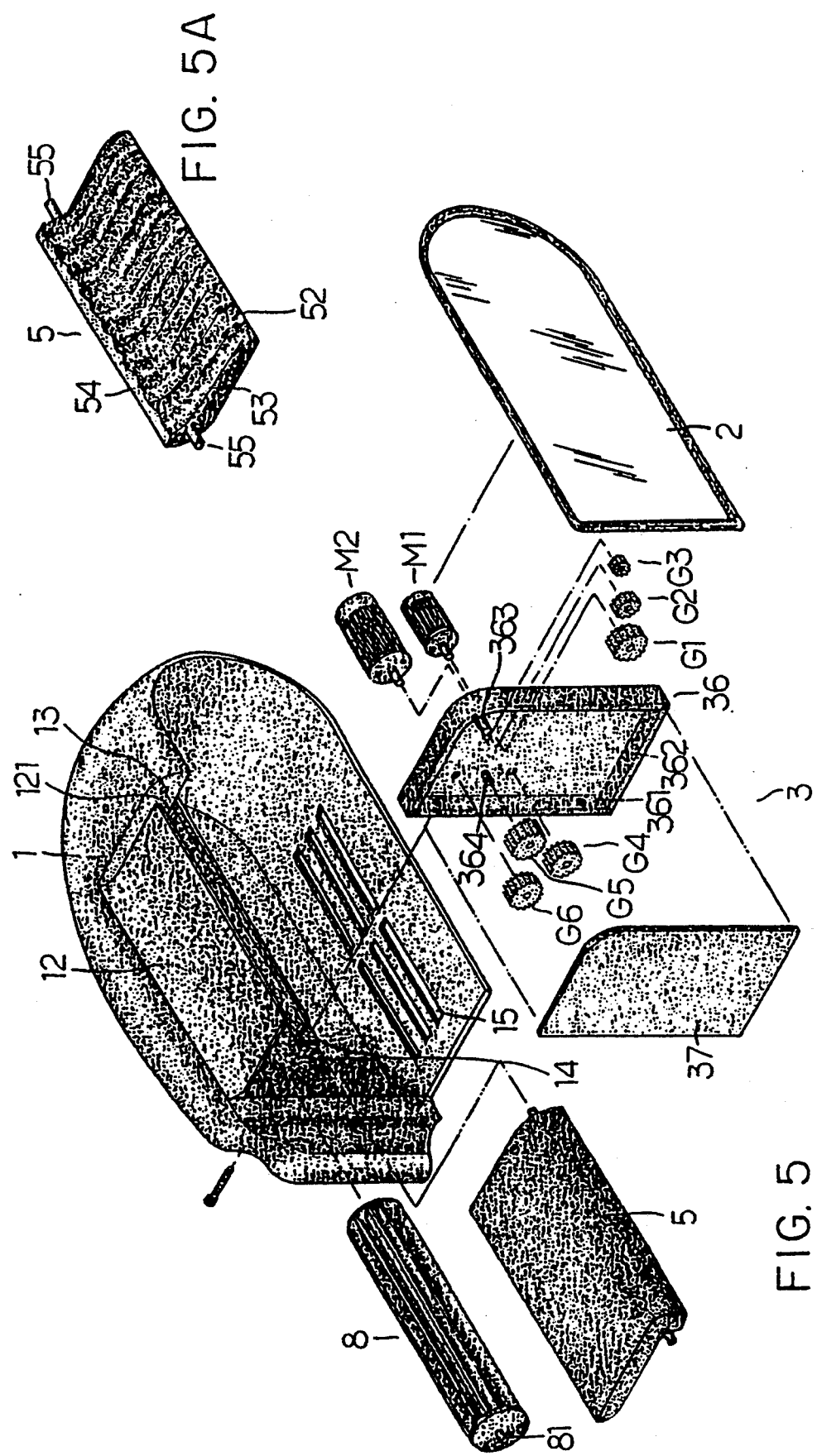

AUTOMOBILE REAR-VIEW MIRROR

This application is a continuation-in-part of parent application Ser. No. 08/114,624 filed Sept. 2, 1993.

BACKGROUND OF THE INVENTION

The present invention relates to an automobile rear-view mirror which comprises a flow guide member controlled by a first motor through a first transmission gear to guide outside currents of air toward the mirror in removing moisture from the mirror, and a rotary vane controlled by a second motor through a second transmission gear to induce a current of air for removing moisture from the mirror.

The rear-view mirrors of an automobile are provided for allowing the driver see traffic approaching from behind. However, the rear-view mirrors may be covered with a mist during a rainy day, causing the rear-view mirrors to be unable to reflect the image effectively. FIGS. 1, 2, 3, 4, and 4A show a structure of an automobile rear-view mirror designed to prevent the aforesaid problem. This structure of an automobile rear-view mirror is generally comprised of a casing 1', a mirror 2' mounted on the casing 1', a ventilation box 3' made of substantially rectangular shape and fastened to the casing 1' and disposed at one side by the mirror 2' near the automobile. The ventilation box 3' comprises an oblong front opening 31' longitudinally disposed on a front side thereof, an oblong bottom opening 32' on a bottom side thereof, a front through hole 34' through the front side, a stop rod 35' raised from the front side and disposed between the front oblong opening 31' and the front through hole 34', and a side through hole 33' on one lateral side thereof. There is also provided a miniature motor 4' installed inside the casing 1', having an output shaft 41' inserted through the side through hole 34' and coupled with a spiral gear 42'. A flow guide member 5' is provided and fastened between the ventilation box 3' and the casing 1' and attached to the mirror 2' at the bottom. The flow guide member 5' comprises two pivot pins 55' longitudinally aligned on two opposite ends thereof near one side, one inserted in a pin hole 11' on the casing 1' and the other inserted through the front through hole 34' on the ventilation box 3' and coupled with a spiral gear 6' meshed with the spiral gear 42' on the output shaft 41' of the miniature motor 4'. The flow guide member 5' further comprises a flow guide surface portion 51' formed of a series of slopes 52' sloping in the same direction. The slopes 52' are linked at one end, each having a bevel top surface 53' respectively sloping downward toward the front door of the automobile at an angle of inclination Θ, and a smoothly and upwardly curved surface 54' on one end abutted to one another. When the automobile is moving, a current of air passes through the ventilation box 3' from the bottom opening 32' to the front opening 31', and then the current of air is guided by the flow guide member 5' to flow toward the mirror 2', and in this manner moisture is carried away from the mirror 2'.

The aforesaid arrangement can effectively remove moisture from the mirror when the automobile is moving at high speed. However, when the automobile is moving at low speed, the wind speed of the current of air being guided through the mirror by the flow guide member is not sufficient to carry moisture away from the mirror. Another drawback of the aforesaid arrangement is that the installation of the flow guide member is difficult.

SUMMARY OF THE INVENTION

The present invention has been accomplished to provide an automobile rear-view mirror which eliminates the aforesaid drawbacks.

According to one aspect of the present invention, the automobile rear-view mirror comprises a casing having a top recess at the top and an elongated opening horizontally disposed in front of the top recess above a front mirror thereof, a flow guide member pivotally mounted on the casing at the top and covered over the top recess, a gear box fastened to the casing at one side and having a first transmission gear driven by a first motor thereof to turn the flow guide member in either direction for allowing outside currents of air to be guided through an elongated opening on the casing toward the mirror to remove moisture from the mirror.

According to another aspect of the present invention, the casing further comprises an angle flange spaced from the top recess and disposed behind the mirror, and a rotary vane disposed on the inside behind the angle flange. The gear box further comprises a second transmission gear driven by a second motor thereof to turn the rotary vane causing it to induce currents of air from vent holes on the bottom of the casing into the casing and permitting the induced currents of air to be guided by the angle flange to flow toward the mirror to remove moisture from the mirror. The second motor is turned on only when the automobile is moving at low speed and the draft of air being guided by the flow guide member is insufficient to remove moisture from the mirror.

BRIEF DESCRIPTION OF THE DRAWINGS

FIG. 4 is an oblique view of the flow guide member of the automobile rear-view mirror shown in FIG. 1;

FIG. 4A is another oblique view of the flow guide member of FIG. 4 taken from the reverse direction;

FIG. 5 is an exploded view of an automobile rear-view mirror according to the preferred embodiment of the present invention;

FIG. 5A is an oblique view of the rectangular flow guide member shown in FIG. 5.

DETAILED DESCRIPTION OF THE PREFERRED EMBODIMENT

Figure 1:
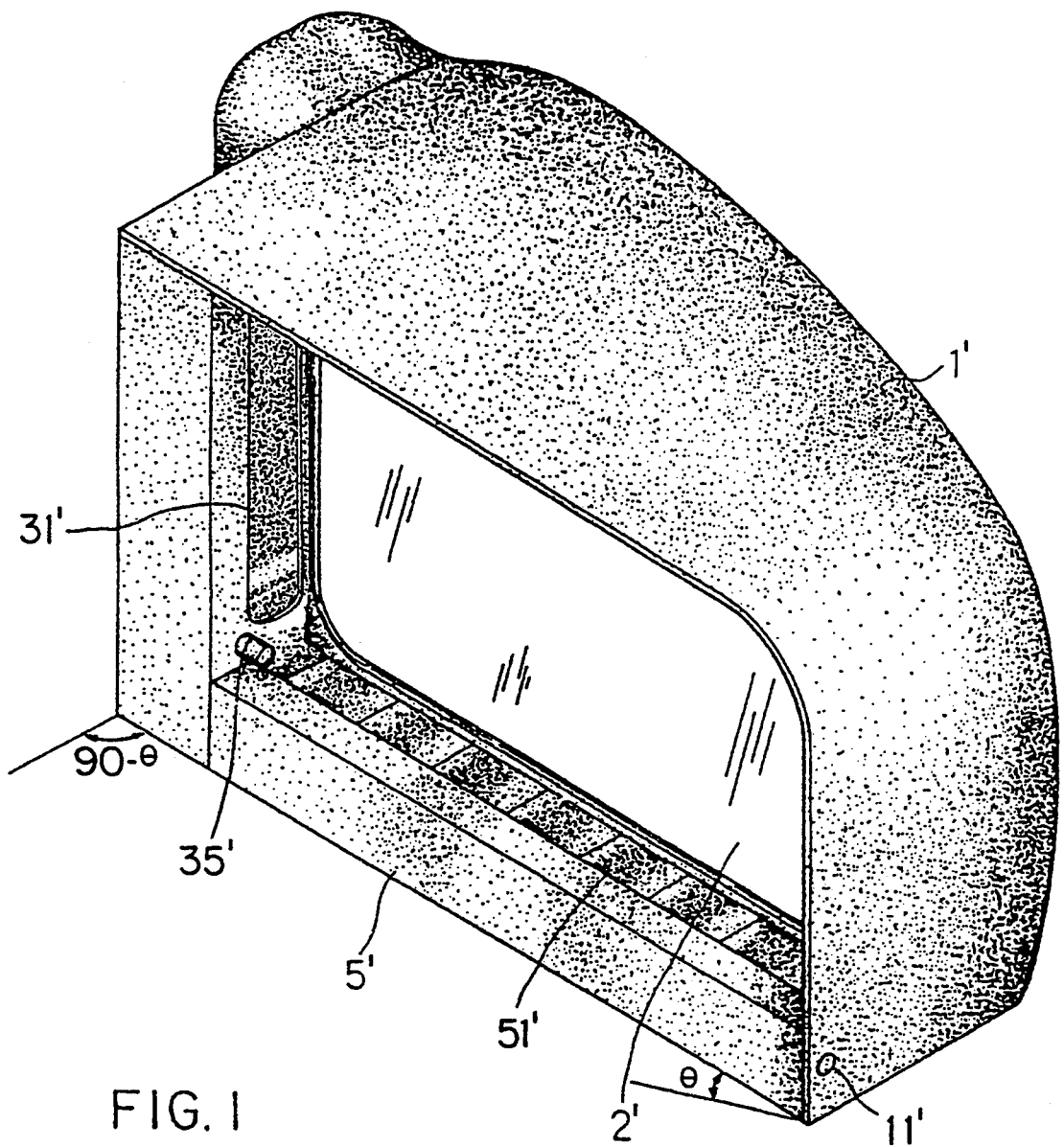
FIG. 1 is an elevational view of an automobile rear-view mirror according to the prior art.
Figure 3:
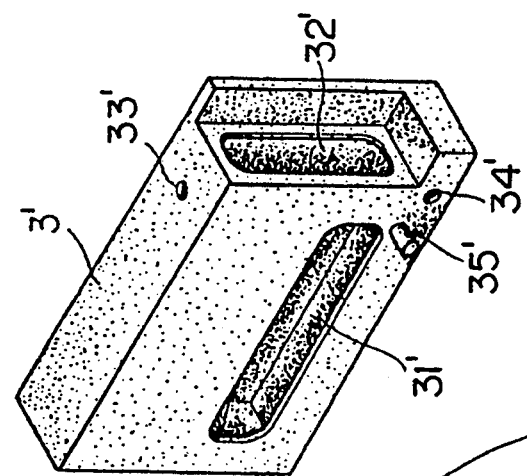
FIG. 3 is an elevational view of the ventilation box of the automobile rear-view mirror shown in FIG. 1.
Figure 2:
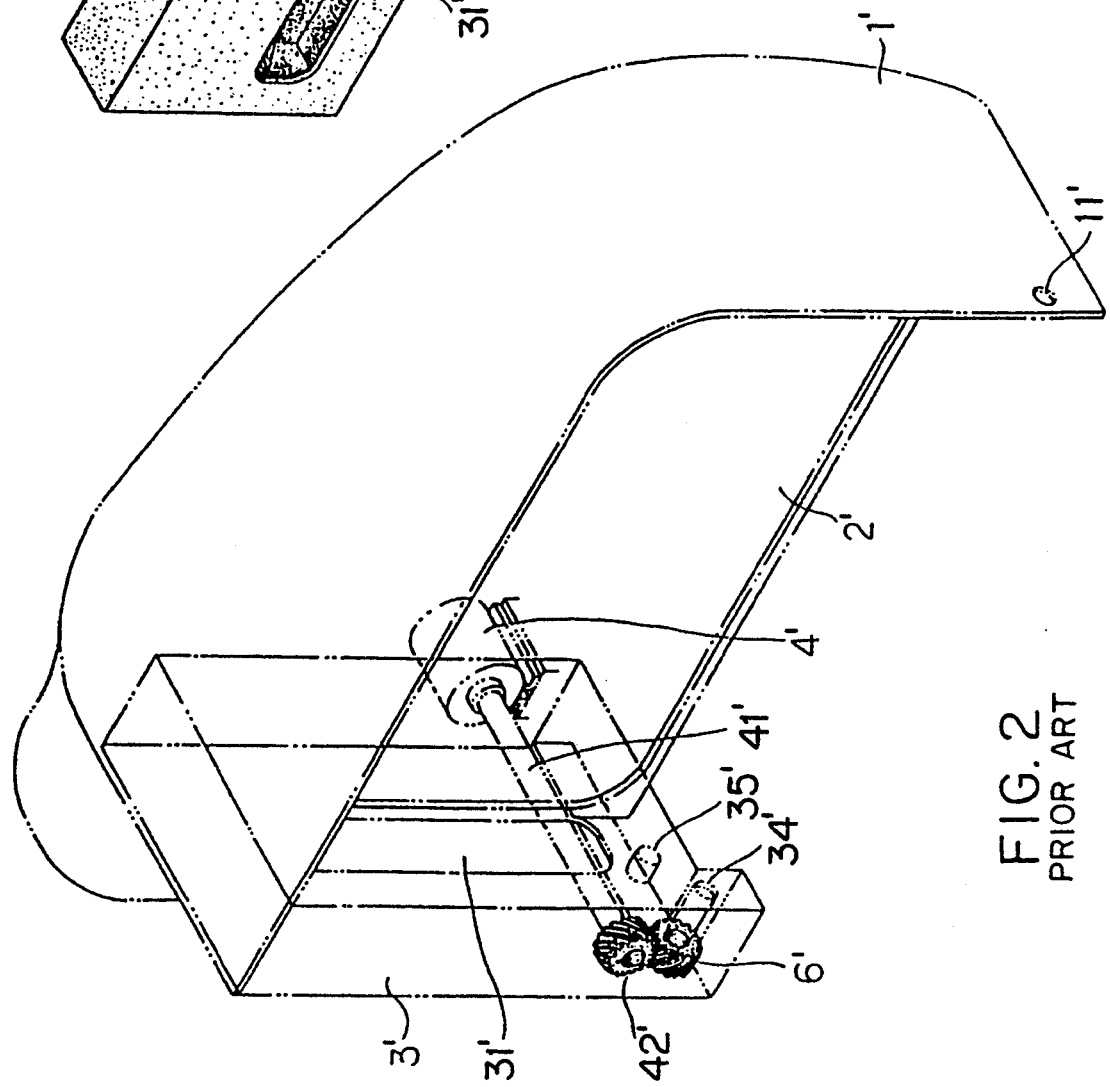
FIG. 2 is a perspective view of the case assembly of the automobile rear-view mirror shown in FIG. 1.
Figure 6:
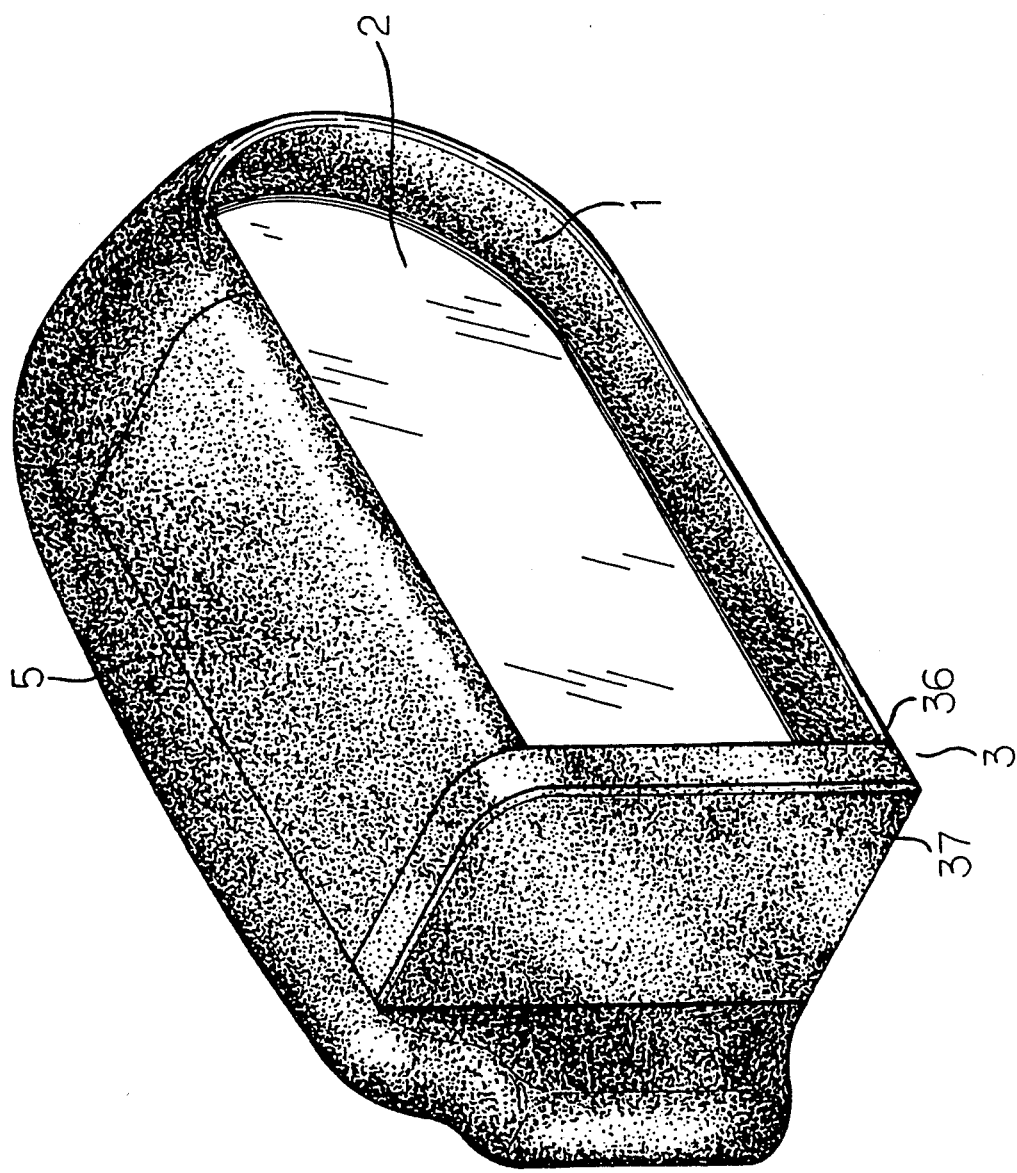
FIG. 6 is an elevational view of the automobile rear-view mirror shown in FIG. 5.

Referring to FIGS. 5, 5A, 6, 7, 7A and 7B, an automobile rear-view mirror in accordance with the present invention is generally comprised of a casing 1, a mirror 2 vertically mounted on the casing 1 at the front, a gear box 3 fastened to the casing 1 at one side, a rectangular flow guide member 5 horizontally pivoted to the casing 1 at the top, and a vane 8 revolvably installed inside the casing 1 behind the mirror 2.

The casing 1 comprises a top recess 12 at the top, an elongated opening 121 at the front of the top recess 12, a pivot hole 13 horizontally disposed at one side at the top, an angle flange 14 spaced below the top recess 12 and disposed behind the mirror 2, and pairs of elongated vent holes 15 disposed at the bottom. The gear box 3 serves as one side panel of the casing 1, comprised of a rectangular box shell 36 and a cover shell 37 covering on the box shell 36. The box shell 36 comprises a side wall 361 fastened to the casing 1, two axles, namely, the first axle 363 and the second axle 364 raised from the bottom wall 362 of the box shell 36. The flow guide member 5 is covered over the top recess 12 of the casing 1, having two opposite pivot pins 55 longitudinally aligned at one end and respectively inserted in the pivot hole 13 on the casing 1 and a pivot hole (not shown) on the bottom wall 362 of the box shell 36 of the gear box 3. The flow guide member 5 further comprises a plurality of parallel teeth. 52 sloping in one direction on a smoothly curved bottom surface 54 thereof and separated from one another by a respective flow guide groove 53. There is a first motor M1 fastened to the box shell 36 of the gear box 3 on the outside and received inside the casing 1 behind the mirror 2, having a driving gear G1 mounted on the output shaft thereof and disposed inside the gear box 3 and meshed with a first transmission gear G2 which is mounted on the first axle 363 on the box shell 36. The first transmission gear G2 is further meshed with a first driven gear G3 which is mounted on one pivot pin 55 of the flow guide member 5. There is a second motor M2 fastened to the box shell 36 of the gear box 3 on the outside and received inside the casing 1 behind the first motor M1, having a driving gear G4 mounted on the output shaft thereof and disposed inside the gear box 3 and meshed with a second transmission gear G5 which is mounted on the second axle 364 on the box shell 36. The second transmission gear G5 is further meshed with a second driven gear G6 which is mounted on the vane shaft 81 of the vane 8 at one end.

Figure 7:
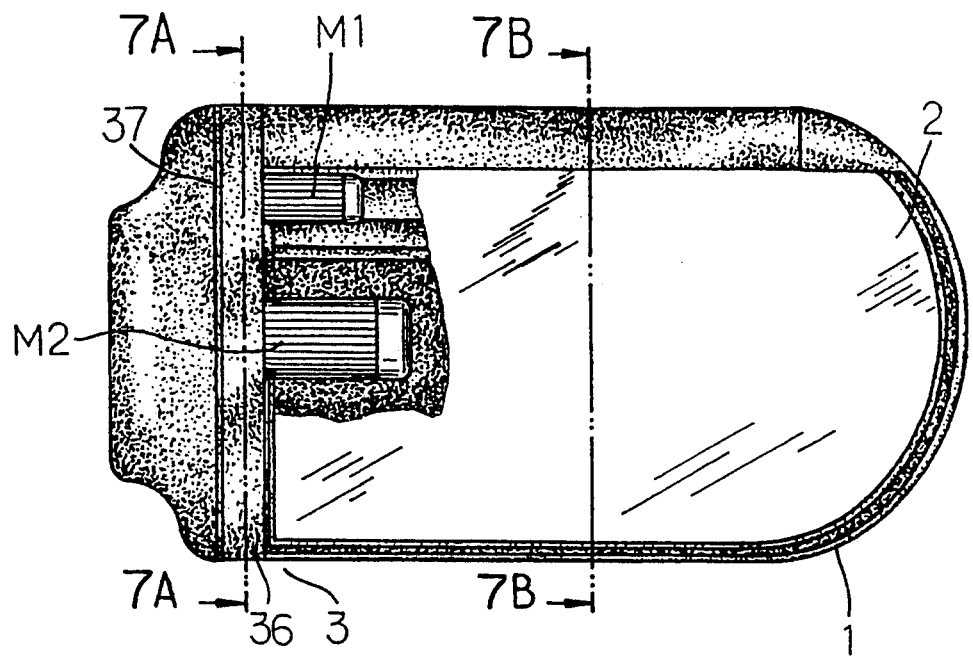
FIG. 7 is a front view of the automobile rear-view mirror shown in FIG. 6.
Figure 7A:
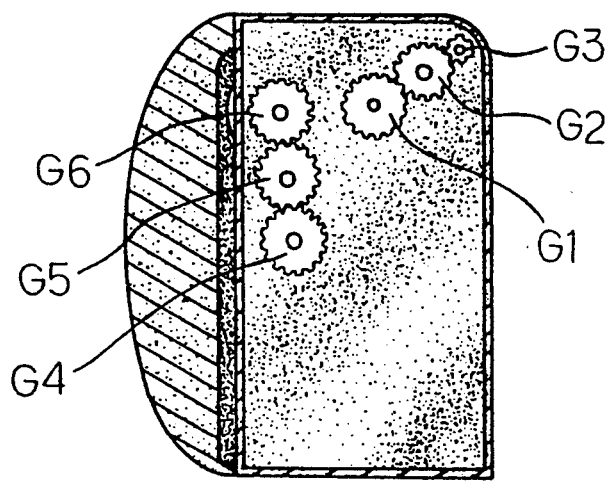
FIG. 7A is a cross-sectional view taken on line A—A of FIG. 7.
Figure 7B:
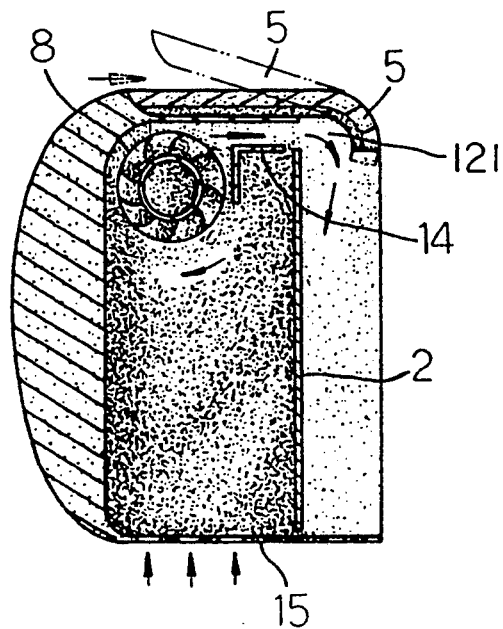
FIG. 7B is a cross-sectional view taken on line B—B of FIG. 7.

Referring to FIGS. 7, 7A, and 7B, and FIG. 5 again, by means of turning on the first motor M1 and the second motor M2 in either direction, the angular positions of the flow guide member 5 and the vane 8 are respectively controlled. When the automobile is moving at high speed, the first motor M2 is controlled to adjust the angular position of the flow guide member 5 permitting sufficient currents of air to be guided through the flow guide grooves 53 of the flow guide member 5 toward the mirror 2. When the automobile is moving a low speed, the second motor M1 is turned on to rotate the vane 8 causing it to induce a current of air from the vent holes 15 into the casing 1, and the induced draft of air is further guided by the angle flange 14 to flow through the elongated opening 121 toward the mirror 2 to remove moisture from the mirror 2.

While only one embodiment of the present invention has been shown and described, it will be understood that various modifications and changes could be made without departing from the spirit and scope of the invention. For example, a stop block may be made inside the casing 1 to limit the turning angle of the flow guide member 5.

What is claimed is:

1. An automobile rear-view mirror comprising:

a casing defining a top recess at a top of the casing, an elongated opening defined horizontally in front of said top recess above a front mirror held by said casing, an angle flange spaced below said top recess and spaced behind said mirror, and pairs of elongated vent holes defined on a bottom wall of said casing;

a flow guide member pivotally mounted on said casing at the top and covered over said top recess;

a rotary vane disposed inside said casing; and a gear box vertically disposed at one side of said casing, said gear box including a first motor, a first transmission gear driven by said first motor to turn said flow guide member in either direction for allowing outside currents of air to be guided by said flow guide member to flow through said elongated opening defined in said casing toward said mirror to remove moisture from said mirror; said gear box further including a second motor, and a second transmission gear driven by said second motor to turn said rotary vane causing it to induce currents of air through said vent holes into said casing and permitting the induced currents of air to be guided by said angle flange to flow through said elongated opening defined in said casing toward said mirror to remove moisture from said mirror.

* * * * *